US008795078B1

(12) United States Patent
Musick, Jr. et al.

(10) Patent No.: US 8,795,078 B1
(45) Date of Patent: Aug. 5, 2014

(54) METHOD AND SYSTEM PROVIDING COMPATIBILITY BETWEEN TWO DIFFERENT CONTROLLERS

(75) Inventors: Charles Musick, Jr., Belmont, CA (US); Robert Kay, San Francisco, CA (US); William Robert Powers, III, San Francisco, CA (US); Dana Wilkinson, Mountain View, CA (US); Youding Zhu, Sunnyvale, CA (US)

(73) Assignee: AiLive Inc., Sunnyvale, CA (US)

( * ) Notice: Subject to any disclaimer, the term of this patent is extended or adjusted under 35 U.S.C. 154(b) by 458 days.

(21) Appl. No.: 12/910,818

(22) Filed: Oct. 24, 2010

Related U.S. Application Data

(63) Continuation-in-part of application No. 12/020,431, filed on Jan. 25, 2008, which is a continuation-in-part of application No. 11/486,997, filed on Jul. 14, 2006, now Pat. No. 7,702,608, and a continuation-in-part of application No. 11/820,207, filed on Jun. 18, 2007, now Pat. No. 7,636,645.

(60) Provisional application No. 61/333,749, filed on May 11, 2010.

(51) Int. Cl.
*A63F 13/211* (2014.01)
*A63F 13/23* (2014.01)
(52) U.S. Cl.
USPC .............................................. 463/37; 710/73

(58) Field of Classification Search
USPC ........... 463/36–27, 36–273; 710/73; 715/700, 715/863; 345/156–184
See application file for complete search history.

(56) References Cited

U.S. PATENT DOCUMENTS

| 2005/0176504 | A1* | 8/2005 | Stanley | 463/37 |
| 2005/0176505 | A1* | 8/2005 | Stanley | 463/37 |
| 2005/0253806 | A1* | 11/2005 | Liberty et al. | 345/156 |
| 2009/0013333 | A1* | 1/2009 | Need | 719/318 |
| 2010/0009754 | A1* | 1/2010 | Shimamura et al. | 463/37 |
| 2010/0069154 | A1* | 3/2010 | Claussen | 463/37 |

* cited by examiner

*Primary Examiner* — Bach Hoang
(74) *Attorney, Agent, or Firm* — Joe Zheng (57) ABSTRACT

Techniques for providing compatibility between two different game controllers are disclosed. When a new or more advanced controller is introduced, it is important that such a new controller works with a system originally configured for an existing or old controller. The new controller may provide more functionalities than the old one does. In some cases, the new controller provides more sensing signals than the old one does. The new controller is configured to work with the system to transform the sensing signals therefrom to masquerade as though they were coming from the old controller. The transforming of the sensing signals comprises: replicating operational characteristics of the old controller, and relocating virtually the sensing signals to appear as though the sensing signals were generated from inertial sensors located in a certain location in the new controller responsive to a certain location of the inertial sensors in the old controller.

15 Claims, 10 Drawing Sheets

METHOD AND SYSTEM PROVIDING COMPATIBILITY BETWEEN TWO DIFFERENT CONTROLLERS

CROSS-REFERENCE TO RELATED APPLICATION

This is a continuation-in-part of co-pending U.S. application Ser. No. 12/020,431, entitled "Self-Contained Inertial Navigation System for Interactive Control Using Movable Controllers", filed Jan. 25, 2008, which claims the priority of the following applications U.S. application Ser. No. 11/486,997, entitled "Generating Motion Recognizers for Arbitrary Motions", filed Jul. 14, 2006, now U.S. Pat. No. 7,702,608, U.S. application Ser. No. 11/820,207, entitled "Generating Motion Recognizers for Arbitrary Motions", filed Jun. 18, 2007, now U.S. Pat. No. 7,636,645, and U.S. application Ser. No. 12/709,523, entitled "Systems and methods for utilizing personalized motion control in virtual environment", filed Feb. 22, 2010, and U.S. Provisional Application 61/333,749 entitled "Long Term Controlled Tracking of Motion Sensing Devices", filed May 11, 2010.

BACKGROUND OF THE INVENTION

1. Field of Invention

The invention generally is related to the area of computer video gaming, and more particularly related to game controllers with full functionalities, where a game controller as designed is preferably independently operable in one hand and fully functions without any attachments or dongles. In one application, two game controllers as designed may be used respectively in two hands, the present invention is further related to techniques for distinguishing which hand is holding which controller when two of the controllers are being held by a user. The use of two controllers may be applied to a classic control by one user, one or two handed freeform motion control by one user, or a one-handed freeform motion control by two users. To allow the controller to work with existing game systems, techniques are also provided for the compatibility between two different controllers.

2. Related Art

A game controller is a user interactive controlling device to control a playable character or object, or otherwise provide input in a video game or an entertainment. Such a controller is typically connected to a game console or computer by means of a wire, cord or nowadays, by means of wireless connection. Controllers which have been classified as games controllers are keyboards, mice, game pads, joysticks, etc. Special purpose devices, such as steering wheels for driving games and light guns for shooting games, are also game controllers.

The Nintendo Wii Remote™ wireless controller and the Playstation Move™ controller are examples of the most recent state of the art in user interactive controllers for computer display game systems. They are movable wireless remote controllers to be held in hands of users. They both come with other peripheral attachments and controllers that help correct for control deficiencies. The Wii Remote uses built-in accelerometers to sense and measure movements of the hand of a player. It includes an infrared sensitive camera which can be pointed at an LED sensor bar placed near a TV to obtain some positional information in a 3D space. This design allows users to control a game using physical gestures, pointing, and traditional button presses. The controller connects to a console using Bluetooth and features a "rumble pack", that can cause the controller to vibrate, as well as an internal speaker to generate various sounds. As a user moves the controller in reacting to a display, the controller transmits sensor data to the console via conventional short range wireless RF transmissions. One expansion device for the Wii Remote is the Wii Motion Plus. The Motion Plus adds a gyroscope sensor to the Wii Remote, giving a total of six independent sources of position and orientation information. The Playstation Move is similar in many regards to the Wii Remote plus Wii Motion Plus.

These types of controllers, however, are limited in the functionality they provide. The Wii and Playstation3 game systems may have recognized the strong value in providing players with an analog stick for more natural control of movement or camera pointing. However, neither system seems to have surmounted the challenges involved with providing this functionality for their independently operable motion controller. So both systems are being shipped with an additional controller with an analog stick. These additional devices are wired or externally attached to the primary controller. For the Nintendo Wii, this additional device is called: Nunchuk. For the Sony Playstation3, this additional device is called: Sub. More broadly, players today either have access to a one-handed limited freeform motion game control modality, or a dual analog stick "classic" control modality (like the Playstation 2 dual-shock controller, or similar controllers for the Gamecube, or the Xbox), or a highly constrained non-freeform (i.e. wired) mix of the two approaches.

There are at least two key challenges in providing game controllers that are fully functional freeform controllers, meaning that they are: independently operable; motion sensitive; able to support motion recognition and motion tracking for one or both hands; and carry a full complement of buttons, triggers and analog sticks.

First, both children and adults (with child- or adult-sized hands) must be able to comfortably hold and operate the control affordances available on the controller, with either the left or the right hand.

Second, the system must make it hard or impossible to confuse which controllers are in which hands or with which people to avoid frequent player frustration. For example, if a player is holding two identical controllers, one in each hand, and puts them down for a moment, how often will they pick up the wrong controller when they come back to the game? If the wrong hand picks up the wrong controller, the motion control results would be subtly wrong since, for example, the inertial data corresponding to a left-handed motion will not match that for a corresponding right-handed motion. The resulting frustration would be analogous to having a TV remote control that works incorrectly half the time you pick it up. Although most game controllers today make it clear which controller is connected to which port with an LED on the controller, none solves the significant technical problem of automatically detecting and displaying which hand is operating which controller in real time without user intervention.

The teachings in the present invention resolve the technical hurdles and detail the first fully-functional free-form motion controllers for games. Players have the full freedom to use both hands independently for motion control games with no constraints between them. The same controllers allow any form of one-handed operation and also support two-handed Halo-style classic controls. The system can automatically detect which controller belongs to which player and which hand, and report that to the player. There is significant value in providing new control interfaces for the video gaming industry and other areas requiring interactive controls.

SUMMARY OF THE INVENTION

This section is for the purpose of summarizing some aspects of the present invention and to briefly introduce some preferred embodiments. Simplifications or omissions in this section as well as in the abstract may be made to avoid obscuring the purpose of this section and the abstract. Such simplifications or omissions are not intended to limit the scope of the present invention.

The present invention generally pertains to a controller with full functionalities in a sense that the controller does not need any attachment and is operable with one hand to fully control an interactive environment being shown. The sensing signals from the controller are sufficient to derive orientations and positions of the controller in six degrees of freedom. According to one aspect of the present invention, when two of such controllers are being used by one user, one embodiment of the present invention is able to distinguish which hand is holding which controller without the intervention of the user. To allow the controller to work with existing game systems, another aspect of the present invention is to provide the compatibility of the controller to an old controller.

Depending on implementation, the present invention may be implemented as a method, an apparatus or part of a system. According to one embodiment, it is a method for movement-based controller disambiguation, the method comprises: receiving in a processing unit a first motion sensing stream and a second motion sensing stream from a first controller and a second controller, respectively, when both the first and second controllers are moved by a user in response to a virtual interactive environment being displayed, each of the first and second motion sensing streams being sufficient to derive estimated positions and orientations of the first or the second controller in six degrees of freedom over time; computing in real time the estimated positions and orientations of each of the first and second controllers; and determining a mapping from each of the first and second controllers with a corresponding one of the first and second motion sensing streams to locations in a world frame of reference relative to a display of the virtual interactive environment.

According to another embodiment, it is a system for movement-based controller disambiguation, the system comprises: at least a first controller and a second controller respectively producing first and second sensing data streams when both of the first and second controllers are moved by a user in response to a virtual interactive environment being displayed, each of the first and second motion sensing data streams being sufficient to derive estimated positions and orientations of the first or the second controller in six degrees of freedom over time; and a processing unit, receiving wirelessly the first and second sensing data streams, configured to compute in real time the estimated positions and orientations of each of the first and second controllers and determine a mapping from each of the first and second controllers with a corresponding one of the first and second motion sensing streams to locations in a world frame of reference relative to a display of the virtual interactive environment.

According to still another embodiment, it is a method for providing compatibility of a first controller to a second controller, the method comprises: receiving inertial sensor data from the first controller; and transforming the inertial sensor data to masquerade as though the inertial sensor data were coming from a set of inertial sensors in the second controller. The transforming of the inertial sensor data comprises: replicating operational characteristics of the inertial sensor data of the second controller, and relocating virtually the inertial sensor data to appear as though the inertial sensor data were generated from inertial sensors located in a certain location in the first controller responsive to a certain location of the inertial sensors in the second controller. Depending on implementation, the operation of the transforming is executed in a driver for the first controller or a software module running on a processing unit configured to work with the second controller; and the transformed inertial sensor data from the first controller works robustly with motion recognizers and motion trackers built for the second controller.

According to still another embodiment, it is a personal control mechanism comprising, the personal control mechanism comprises: pair of controllers, each of the controllers including: a housing having at least a forward end, a top surface and a bottom surface, the forward end including an emitter emitting light to be captured by a receiver remotely located, the top surface including a number of buttons and a joystick operable by a finger of one hand, the bottom surface including a trigger operable by another finger of the hand, the housing sized comfortably to fit into either hand and having a holding portion designed in a way that the trigger, the buttons and the joystick are readily operated when the holding portion is being held in either hand, and a plurality of inertial sensors producing sensing signals that are sufficient to derive relative positions and orientation in six degrees of freedom. The sensing signals of each of the controllers are received in a processing unit configured to generate a virtual interactive environment in which at least one of objects is responsive to the sensing signals of either one of the controllers. The sensing signals from the two controllers are processed in such a way that the two controllers are functioning to provide a classic control by one user, one or two handed freeform motion control by one user, or a one-handed freeform motion control by two users.

According to yet another embodiment, it is a personal control mechanism for a user, the personal control mechanism comprises: a housing having at least a forward end, a rearward end, a top surface and a bottom surface, the forward end including an emitter emitting a light beam to be captured by a receiver remotely located, the rearward end including a socket to allow the handheld controller to be charged when the socket is plugged with a power charger, the top surface including a number of buttons and a joystick operable by a finger of the hand, the bottom surface including a trigger operable by another finger of the hand, the housing sized comfortably to fit into the hand and having a holding portion designed in a way that the buttons and the joystick are readily operated by the finger when the holding portion is being held in the hand, a plurality of inertial sensors producing sensing signals that are sufficiently to derive relative positions and orientation in six degrees of freedom, a processor provided to process the sensing signals and an action signal from one of the buttons and the joystick when the one of the buttons and the joystick is operated; and a wireless module coupled to the processor to transmit the sensing signals and the action signal to a base unit remotely located, the base unit configured to derive the positions and orientation in six degrees of freedom from the processed sensing signals and producing a virtual environment in which at least one object being controlled by the handheld controller moves according to the relative positions and orientation and reacts according to the action signal.

One of the objects, features and advantages of the present invention is to provide a lot of flexibility in controlling a virtual environment. The use of the controllers as designed is applicable to a classic control by one user, one or two handed freeform motion control by one user, or a one-handed freeform motion control by two users.

Other objects, features, benefits and advantages, together with the foregoing, are attained in the exercise of the invention in the following description and resulting in the embodiment illustrated in the accompanying drawings.

BRIEF DESCRIPTION OF THE FIGURES

These and other features, aspects, and advantages of the present invention will be better understood with regard to the following description, appended claims, and accompanying drawings where:

DETAILED DESCRIPTION OF THE INVENTION

The detailed description of the invention is presented largely in terms of procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Figure 1A:
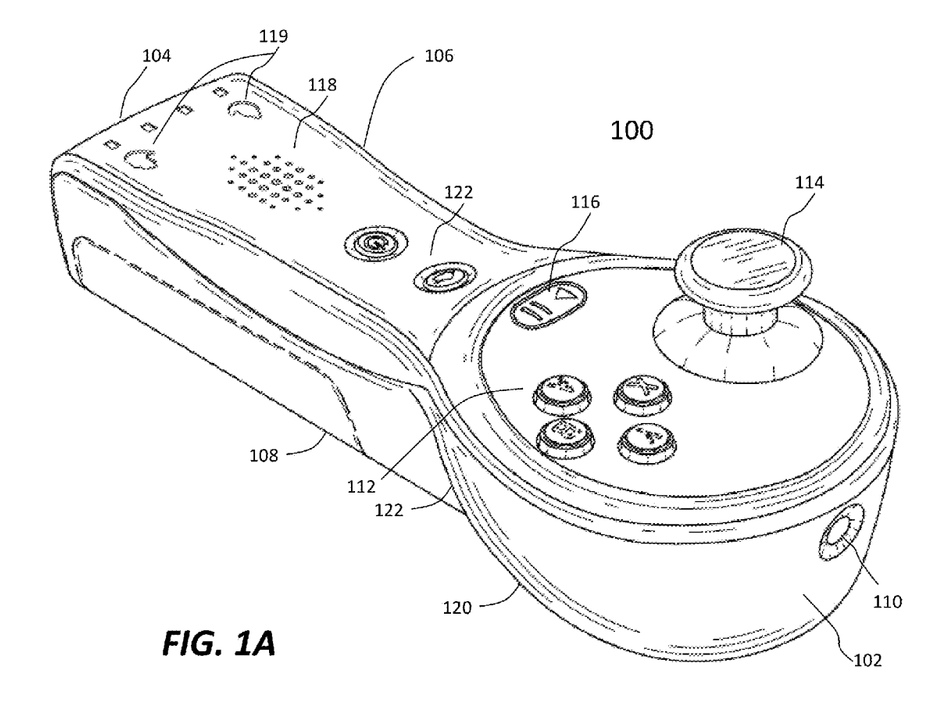
FIG. 1A shows an exemplary controller according to one embodiment of the current invention.
Figure 1B:
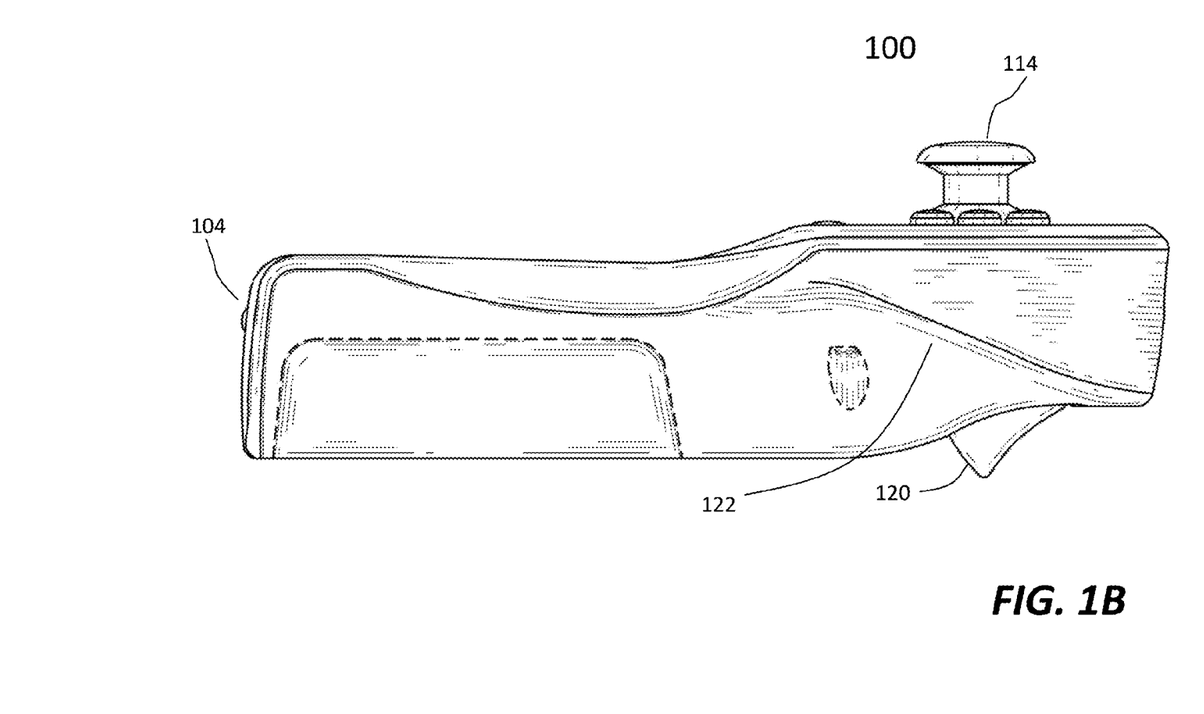
FIG. 1B shows a side view of the controller shown in FIG. 1A.

Referring now to the drawings, in which like numerals refer to like parts throughout the several views. FIG. 1A shows an exemplary configuration of a controller 100 according to one embodiment of the current invention and FIG. 1B shows a side view of the controller 100. The controller 100 resembles a handheld device operable by a single hand. The controller 100 includes a housing made of a light material (e.g., plastic or the like). The housing has a generally parallelepiped shape extending in a longitudinal direction from front to rear. The overall size of the housing is small enough to be held by one hand of an adult or a child.

The housing includes at least four sides, a forward end 102, a rearward end 104 (not visible), a top surface 106 and a bottom surface 108 (not visible). The forward end 102 includes at least one emitter 110 designed to emit one or more signals. According to one embodiment, the emitter 110 includes an infrared LED emitting infrared light that may be received by an image sensor, providing information that constrains where the controller 100 is pointing at.

Depending on implementation, besides a mechanism for a wrist strap attached thereto, the rearward end 104 may include a socket to allow the controller 100 to be charged when the socket is plugged with a power charger. The socket may be also designed to communicate with another device. For example, the socket may be in form of a USB socket, the controller 100 can thus communicate with a computing device through a USB cable to get updates or exchange data with a device that is Internet enabled. Optionally, the housing provides an opening to accommodate a readable medium (e.g., a flash memory card or microSD) to transport data in or out the controller 100.

Near the front part of the top surface 106, there are a number of operation or action buttons 112, a joystick (e.g., analog stick, or analog joystick) 114, a status button 116, a speaker 118 and two hand indicators 119. Each of the action buttons 112 is configured per a game to be played. The joystick 114 is a control affordance comprising a stick that pivots on a base and reports its direction (or angle) and force. Depending on implementation, the joystick 114 may be implemented in different forms, but primarily to be operated by a finger (e.g., a thumb) of a hand holding the controller 100. In one application, through an operation on the joystick 114, a user of the controller 100 can instruct a direction in which a character or the like appearing in a virtual game world is to move or a direction in which a cursor is to move.

According to one embodiment, the housing of the controller 100 is sized comfortably to fit into one hand and designed to have a holding portion in a way that the buttons 112 and the analog stick (or joystick) 114 are readily operated by a thumb when the holding portion is being held in the hand and another finger is on a trigger 120. Depending on a game being played, the trigger 120 may be used as a gun trigger in a shooting game, or a gas pedal in a driving game, or a means to indicate grabbing. To facilitate a child's ability to comfortably reach the buttons 112, analog stick 114 and trigger 120, the neck of the forward part of the housing is made as thin as possible, and the undersurface 122 of the housing under the joystick and buttons is deeply grooved to provide easy access for a finger. In one embodiment, the buttons 112 are small, in a diamond formation, and placed as close to the joystick 114 as is feasible for a large-handed adult to accurately access all. The grooves on the undersurface 122 are symmetric along the longitudinal axis of the controller so that both the left and right hands have easy access to the trigger 120. The centerline of the joystick 114 is lined up with the buttons 112 so that both left and right hands of a person have equal access to the stick 114 and the buttons 112.

The start button 116 is provided to assist the user to start games, to pause them, and for other common interactions with electronic video games.

The speaker 118 is provided to generate sounds (e.g., the sound of a ball hitting a tennis racquet). The two hand indicators 119 are provided, but only one will be turned on, to indicate whether the controller 100 is being held by a left or right hand. There are other buttons 122 each of which has a top surface thereof buried in the top surface 106 so as not to be inadvertently pressed by the user.

One of the important features, advantages or benefits provided by the controller 100 is that it supports all classic control mechanisms that one would expect when playing a non-motion-sensitive computer video game, where the player holds one of these controllers in each hand, and has access to the dual analog stick, dual trigger, and multiple button control mechanics that were popularized by games like Halo. This includes control modalities that are comfortably operable by one hand of the person holding the controller.

Additionally, because the controllers are independently operable in either hand, and each controller 100 is capable of generating inertial sensor signals sufficient to derive relative orientations and positions in six degrees of freedom, the player may engage in free-form motion control with both hands physically moving and generating motion-sensitive control signals independently. Unless specifically stated, a 6D location or locations of a controller includes 3 translational data and 3 angular data, a position, positions, a location and locations are interchangeably used herein. Optionally, with an external imaging device, an optical signal emitted from each controller is captured and analyzed to help determine drift-free orientations and positions in six degrees of freedom relative to the external imaging device, in conjunction with the inertial sensor signals.

Figure 1C:
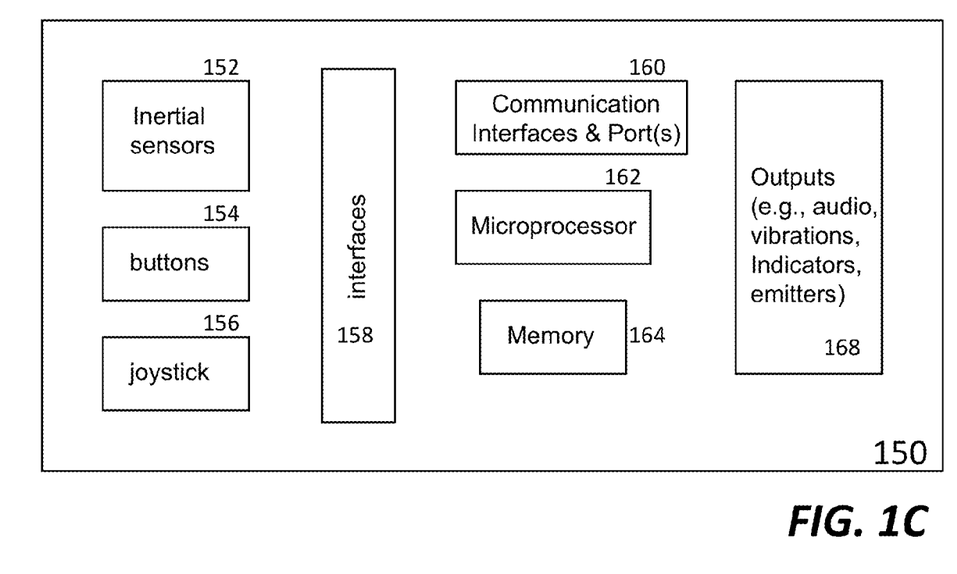
FIG. 1C shows a functional block diagram of an controller according to one embodiment of the current invention.

FIG. 1C shows a function block diagram of a controller 150 that may correspond to the controller 100 of FIG. 1A. The controller 150 includes a plurality of inertia sensors 152 such as linear sensors (e.g., accelerometers), rotation sensors (e.g., gyroscopes), magnetometers, and other sensors whose output can be transformed and combined to continuously calculate via dead reckoning the position, orientation, and velocity (direction and speed of movement) of a moving controller without the need for external references. Typically such estimations are good for short periods of time before drifting, due in part to sensor noise and errors, non-linearities and analog-to-digital conversion bucket size issues.

According to one embodiment, there are at least three linear sensors and three rotation sensors, each producing a signal when the controller 150 is caused to move from one position to another position. The signals from the inertia sensors 152 are coupled to a processor 162 via interfaces 158 to send the signals to a base unit (not shown) via one of the communication ports 160. Depending on implementation, the communication port for transmitting the inertia sensor signals to the base unit may be based on Bluetooth or wireless data communication (e.g., WiFi).

In operation, an action signal is generated when one of the buttons 154 and the joystick 156 is manipulated. The action signal is also coupled to the processor 158 via the interfaces 158. According to one embodiment, the processor 162 is configured by a module stored in memory 164 to package the action signal together with the inertia sensor signals for transmission to the base unit.

In addition, the processor 162 is configured to drive one or more outputs 168 depending on the action signal(s) and/or the inertia sensor signals in conjunction with the virtual environment being displayed at the moment. Different from any controllers in the prior art, and critical to the viability of a full featured control system including independently operable motion sensing controllers, the processor 162 is configured to indicate which hand is holding the controller by turning on one of the two indicators 120 on the top surface 106 of the controller 100 in FIG. 1A.

Figure 1D:
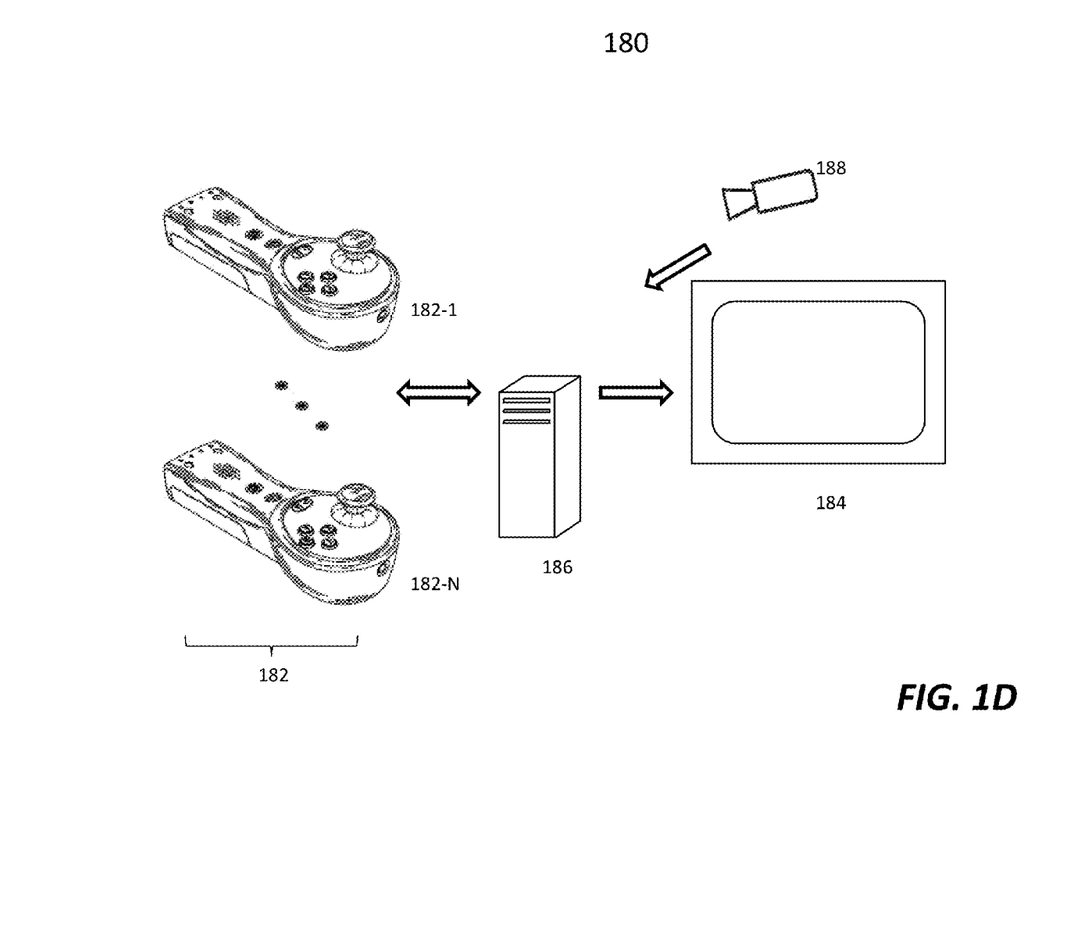
FIG. 1D shows a configuration in which a number of controllers are used to interact with a virtual environment being displayed on a display screen (e.g., a television) via a base unit.

FIG. 1D shows a configuration 180 in which a number of controllers 182 are used to interact with a virtual environment being displayed on a display screen 184 (e.g., a television) via a base unit 186. The base unit 186 is caused to execute an application and drive the display 184 to show the virtual environment. When one of the controllers 182 transmits signals, the base unit 186 is configured to receive the signals and derive orientations and positions of the controller from which the signals are received. The base unit 186 is also configured to receive signals from the camera 188 which may receive infrared signals from the IR LEDs on the controllers 182, and use this information to help eliminate any drift in positions and orientations of the controllers. Likewise the base unit 186 may send one or more signals to drive one or more outputs on the controller. In particular, an appropriate one of the indicators 119 on the top surface 106 of the controller 100 in FIG. 1A is turned on by a signal from the base unit 186 in conjunction with the application being executed therein.

Unless specifically stated, the base unit 186 as used herein may mean any one of a dedicated videogame console, a generic computer or a portable device. In reality, the base unit 186 does not have to be in the vicinity of the display 184 and may communicate with the display 184 via a wired or wireless network. For example, the base unit 186 may be a virtual console running on a computing device communicating with the display 184 wirelessly using a protocol such as wireless HDMI. According to one embodiment, the base unit 186 is a network-capable box that receives various data (e.g., image and sensor data) and transports the data to a server. In return, the base unit 186 receives constantly updated display data from the server that is configured to integrate the data and create/update a game space for a network game being played by a plurality of other participating base units.

Figure 2A:
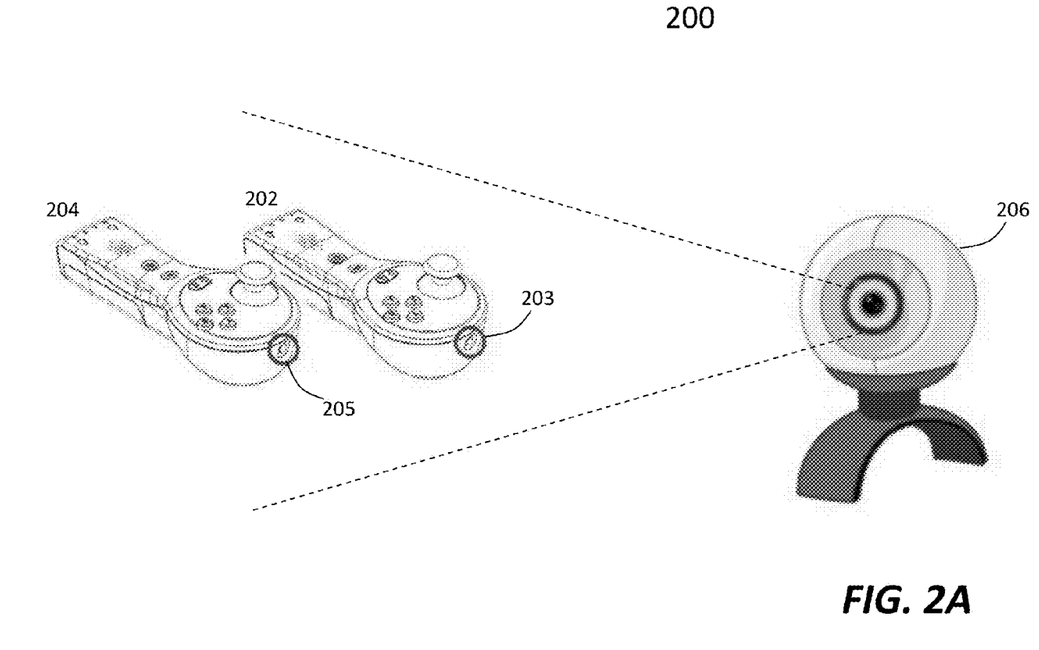
FIG. 2A shows that two controllers are being imaged within a field of view by a camera, image signals from which facilitate the determination of absolute orientations and positions of the controllers in conjunction with the inertial signals coming from the controllers.

FIG. 2A shows a configuration 200 in which two exemplary controllers 202 and 204 are being imaged within a field of view by a camera 206. These two controllers 202 and 204 may be being held respectively by two players or in two hands of one player. The camera 206 is preferably disposed in front of the player(s), for example, on top of a display to capture movements of the two controllers 202 and 204 within the field of view by the camera 206. In one embodiment, when either one of the two controllers 202 and 204 happens to go beyond the field of view of the camera 206, signals from the inertial sensors, magnetometers or other tracking-related sensors in the controller may be used to facilitate the tracking of the movement.

In one embodiment, the LED emitters 110 emit in the infrared spectrum so as to be largely invisible to human eyes, and have a wide half power angle to facilitate easy detection over gross player movement; and the camera 188 is equipped to filter out wavelengths that are not matched to the LED emitters.

In another embodiment, the LED signals from the emitters 110 are detected with sub-pixel accuracy and tracked from frame to frame on an image map that is generated by the camera 188. The per-frame LED locations on the image map are used to eliminate the drift and other errors stemming from pure inertial sensor-based tracking of the absolute orientations and positions of the controllers.

Figure 2B:
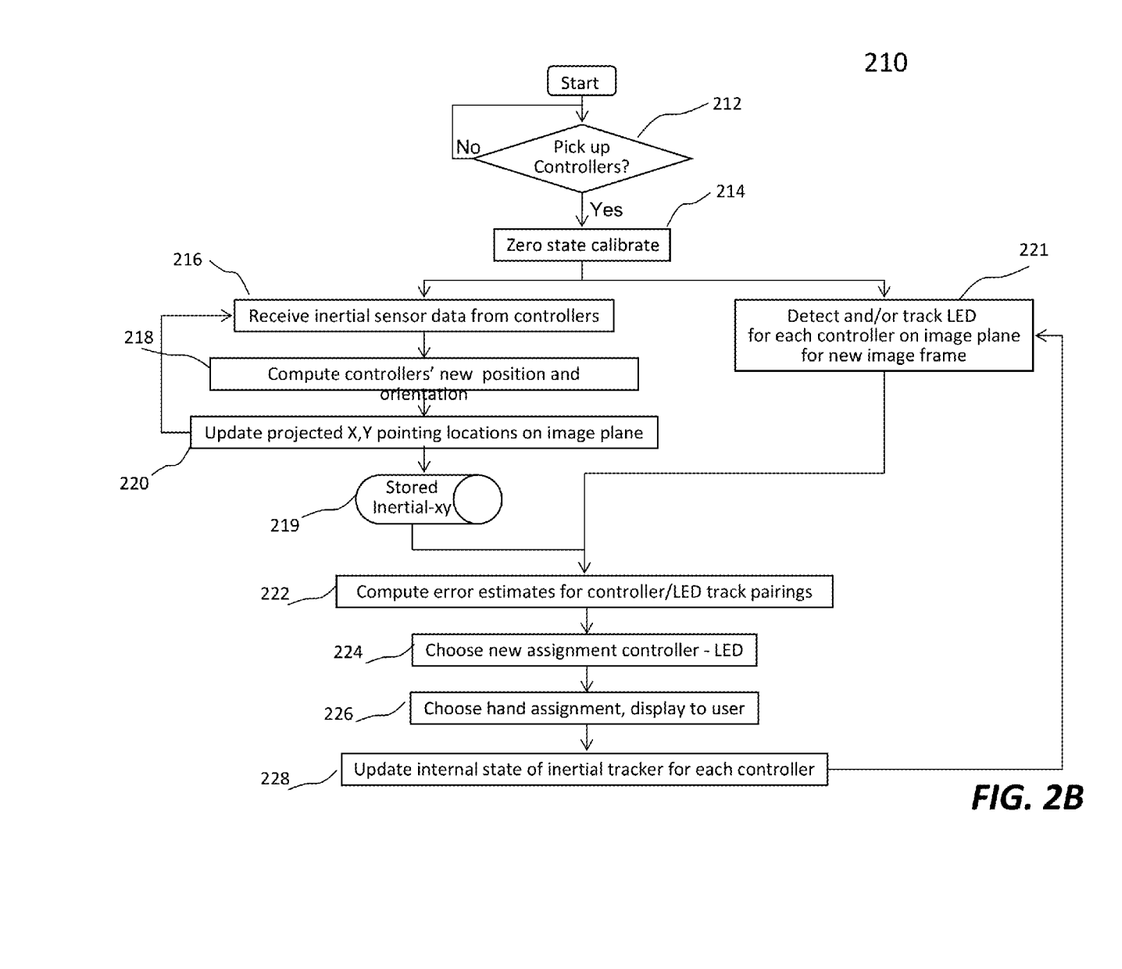
FIG. 2B is a flowchart or process of determining which controller is being held in which hand.

FIG. 2B shows a flowchart or process 210 of describing movement-based controller disambiguation as applied to detecting which controller is in which hand of a player. The flowchart 210 may be implemented in software, hardware or in a combination of both thereof, and may be understood in conjunction with FIG. 1A-FIG. 1D. It is assumed that there are two controllers, each is designed according to one embodiment of the presentation as shown in FIG. 1A. The controllers are in sleeping mode or turned off when they are not used. In 212 a player picks up both controllers and turns them on. Once the controllers are in working mode, the process 210 proceeds. In 214 an initial dynamic calibration is automatically performed. The calibration includes zeroing the initial location from which position tracking of a controller will be computed, until the world frame of reference relative to the display 184 is computed. Often an initial rough correspondence is achieved "behind the scenes" by requiring the player to point and select certain boxes being displayed on the display. The camera 188 is in an approximately known position, for example, above or below the display, and is positioned to be able to capture such pointing events. The pointing location, including the rough orientations of the controller at the time of pointing as determined by the force gravity exerted on the inertial sensors, has enough information to form many constraints on the possible positions of the player with respect to the display.

Once initial calibration is complete in 214, two threads are initiated: one has to do with driving the inertial sensors 152 in the controllers and computing the 6D positions and orientations. The second thread has to do with driving the camera to track the LED locations of the controllers as they show up in the recorded image of the camera (e.g. an X,Y location in the image plane). In 216, the processing unit 186 receives inertial sensor data from each of the two controllers. In one embodiment, the inertial sensors include a three-axis accelerometer and a three-axis gyroscope. In another embodiment the inertial sensing is provided by a three axis accelerometer combined with a 3-axis magnetometer whose output can be transformed to provide angular velocity. The main requirement is to have enough inertial information to support computation of the 6D orientation and position of each of the controllers in real time.

In 218 the new positions and orientations of each controller is computed based on the last known positions and orientations, the inertial forces recorded in 216, and possibly other state internal to the inertial tracker.

In 220, the 6D relative position and orientation for each controller as determined in 218 is updated and used in conjunction with the last estimated relative depth for each controller, and the last estimated X,Y pointing location of each controller on the camera's image plane, to compute a new estimated INERTIAL-XY from the pointing and relative depth estimate for each controller. INERTIAL-XY refers to the X and Y component of a part (e.g., a tip) of the controller on an image plane, as determined in part in 218 from the inertial estimates of the positions and orientations of the controller, and the relative depth with respect to the display. The INERTIAL-XY values are stored in 219 for subsequent updating by 220 and use by 222. Initially the pointing and relative depth estimates with respect to the display may be quite poor, especially on the first pass where these estimates are initialized in 214. The estimates improve significantly after the first full pass through this process 210. Once the new estimates are computed, the control passes back to 216 to wait for the next set of inputs from the controllers. Typically inertial sensors can be read, communicated and processed at a much higher rate than the image data.

In one embodiment, the inertial sensor-based tracking solution described in 216, 218 and 220 and whose INERTIAL-XY data is stored in 219 is updated continuously, and will typically update many times before a single image frame is processed and control in one thread passes to 222. In one embodiment, every controller has its own thread and its inertial sensors are processed asynchronously with respect to the other controllers and the camera.

In 221, each camera image frame is processed asynchronously to detect and track all the LEDs that are in the viewing frustrum of the camera 188. The output is the X, Y pixel location in the pixel map (i.e. image frame) representing the center of the excitation area for each LED signal that was detected. Not all controllers may be represented in an image frame, since not all controllers may be pointing toward the display and the camera at every moment. In one embodiment, the image is scanned periodically to detect new LEDs, which are then in subsequent frames tracked by scanning the pixels local to the last known X,Y coordinates of the center of the area of LED excitation. Depending on implementation, various measures may be taken to minimize signal disturbance to the excited pixels representing the LEDs. For example, a filter may be used to enhance the wavelengths of the LEDs with respect to others from ambient lighting sources so that it is easy to process an image frame to locate the areas containing the LED. In one embodiment a classifier is built based on several features and the classifier is used to differentiate real LED signatures from false locations resulting from other lighting. In another embodiment the LED location is tracked to sub-pixel accuracy by using a modified center of mass calculation for the LED patterns, which when the controllers are being moved, take on a comet-like appearance.

The process 210 passes from 221 once the LED tracking scan is completed for a given image frame. In 222 a collection of error estimates are computed for each possible pairing of the LED-XY positions computed in 221 to INERTIAL-XY positions stored and continuously updated in 219. There are several possible error estimates of merit. One is a simple output error estimate, the root-mean-squared error between the two XY positions (i.e. $\sqrt{(x1-x2)^2+(y1-y2)^2}$). Another one is analogous to a minimum edit error, what is the smallest change in the estimated controller position needed to move the INERTIAL-XY pointing location from the current position to the LED-XY position. For example, imagine the INERTIAL-XY as the splash of light on a wall created by a candle fixed to the end of a stick, and the LED-XY as the target point—the minimum edit error is a measure of how much the stick must be moved to match the splash of light with the target point. It can be useful to consider the component estimates (change position only or orientation only) of the minimum edit error separately as well. Still another one is a vector difference between a vector composed of the last few frames of LED-XY data and the corresponding time frame vector of INERTIAL-XY data (derivative error). Yet another one is the INERTIAL-XY difference with the controller that last frame was matched with the current LED-XY (stability error).

In one embodiment a predictor is constructed and uses a regression estimate of some or all of the above errors to compute a final error. In another embodiment an estimate of the probability of the pairing is created and computed as a Dirichlet probability over a fixed number of passes through the 221-228 loop to determine if this pairing is a bad match—i.e. is incorrect. In another embodiment the averaged normalized estimate of all of the estimates that agree are returned. There are many possible combinations of error estimates, it should be clear to those skilled in the art that exactly how the estimate is chosen is not a matter of significant concern as long as it is rational and data driven.

In 221 and 222, the movement-based disambiguation process is effectively providing a second, independent estimate of the 6D orientation and position of each controller. It is not necessary for this independent estimate to provide 2 degrees of freedom (i.e. the XY location on an image frame)—the approach extends to an independent estimate of anywhere from 1 to 6 degrees of information. Viable alternatives to this optically-driven (LED and camera) approach include a sonar-based emitter/receiver pair, and magnetometer based approaches where enough is known about the ambient field.

In 224, the error estimates of each possible pairing between controller-based INERTIAL-XY and camera-based LED-XY is received from 222 and a new assignment is made that maps each controller to 0 or 1 LED-XY points. In one embodiment, this decision is not strictly based on the current minimal error, but rather on a function of the current error estimates, the overall stability of recent assignments, and the degree of clarity that a previous assignment needs to be modified.

In 226, the controller to LED-XY assignments from 224 are received, and used to provide a mapping to the left or the right hand of the player. In one embodiment the significant assumption is made that players will face the display without crossing their hands, and so the hand assignment is rather trivial given the relative LED-XY positions in the image plane of each controller. In one embodiment, a face tracker is used to verify that a human face is detected. An important feature and benefit of this invention is that players never need to think about "which controller am I supposed to hold in which hand?", eliminating a significant barrier to this form of fully functional free form motion control.

In another embodiment, additional camera-independent inputs are used in this decision, one of which is an inertial-only recognizer which is analyzing the motion stream and returning a series of probabilities that each stream is sourced from a controller which is in one of four situations: in the right hand of a right-handed person, in the right hand of a left-handed person, in the left hand of a right-handed person, or in the left hand of a left-handed person. On average, at rest, over a longer period of time, humans tend to hold controllers in such a way that they are inner-pointing—this and other tendencies can be picked up by a classifier trained on features related to the inertial signals received from one controller compared to the other controller.

In 228 the internal state of the inertial tracker for each controller used in 218 and 220 is updated. This inertial state includes the most recent estimated orientation of the controller, an absolute depth from the display (and so from the camera), a relative location, pointing XY on the image plane, velocity vector and various error estimates. The inertial state is corrected to adjust the estimated inertial position and orientation so that the pointing INERTIAL-XY matches the paired LED-XY. In one embodiment, this entire adjustment is made during every visit to 228. In another embodiment, the adjustment is smoothed out and collected over several passes through 228 to avoid the appearance of jerkiness in the virtual interactive environment being shown on the display.

An important feature and benefit of this process is the ability to map from a virtual environment being displayed on the display to the world frame in reference to the display and the player. The ability to detect and report a hand assignment to the player is just one useful benefit, and there are many more forms of player interaction with the physical and virtual world that are enabled by having access to the relative depth of both controllers and to their relationship with the player, especially as this methodology is generalized to multiple players and multiple controllers.

It shall be noted that the process 210 in FIG. 2B is not limited to being applied to two controllers and one player. Those skilled in the art shall understand from the description that the process 210 is applicable to any number of controllers and players. In one embodiment, the process 210 facilitates to disambiguate a number of controllers, in which at least one player holds two controllers in each of his/her hands and/or at least one player holds one controller in one hand. Additionally, the controller disambiguation in FIG. 2B maps results to the world frame of reference by assigning a left or a right hand to the player that has picked up the controllers. One of the important features and advantages is that the image plane provides a representation of the world frame of reference, and the mapping from controller to LED track in 224 provides a mapping from controllers to world frame of reference that can be reflected accurately and in more detail to players in many useful and interesting ways, for example, as a key enabling technology for augmented reality applications.

Figure 3A:
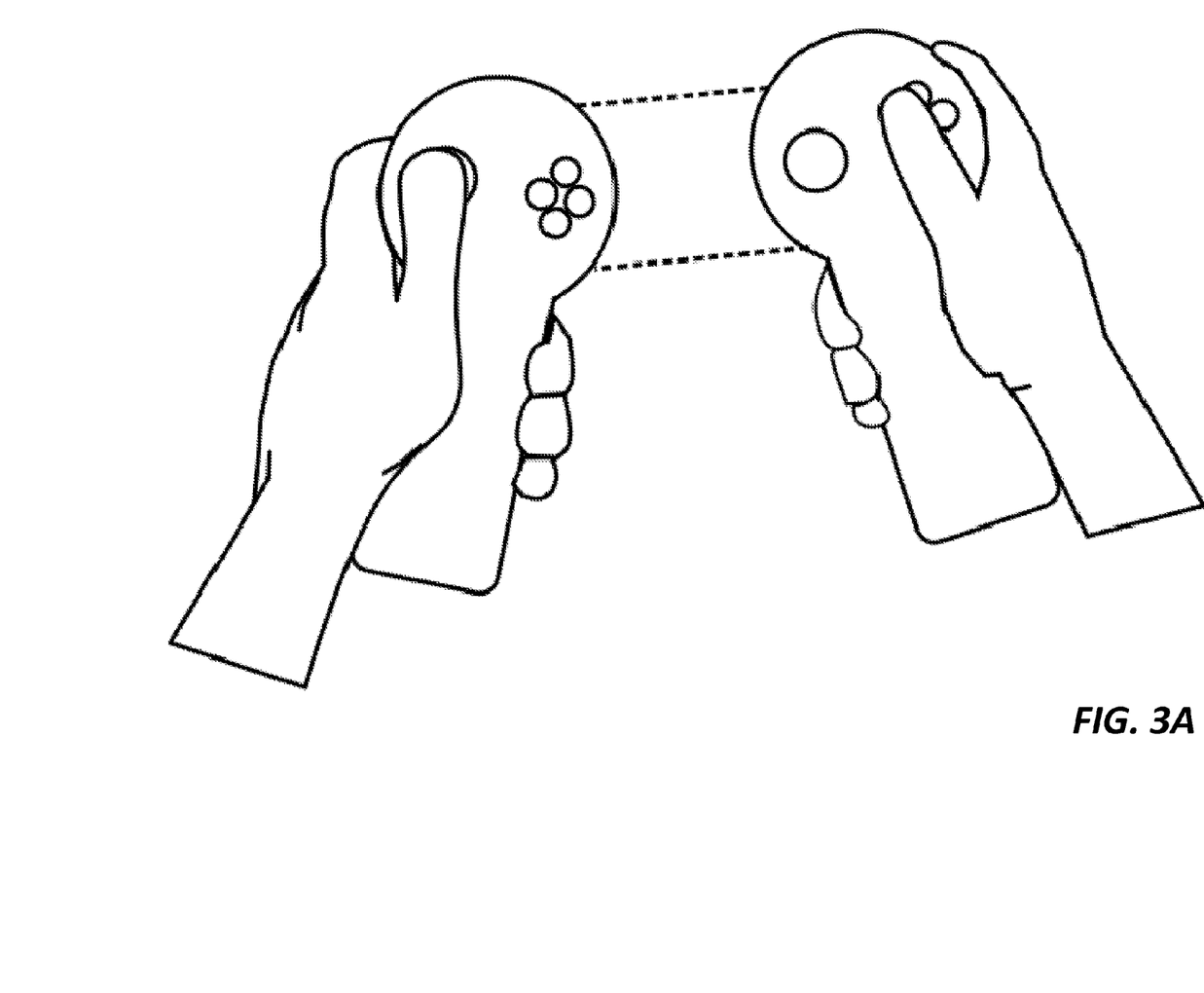
FIG. 3A shows two controllers are respectively being manipulated by left and right hands of a user in a classic control style, wherein the dashed line connecting the two controllers is for illustration only.
Figure 3B:
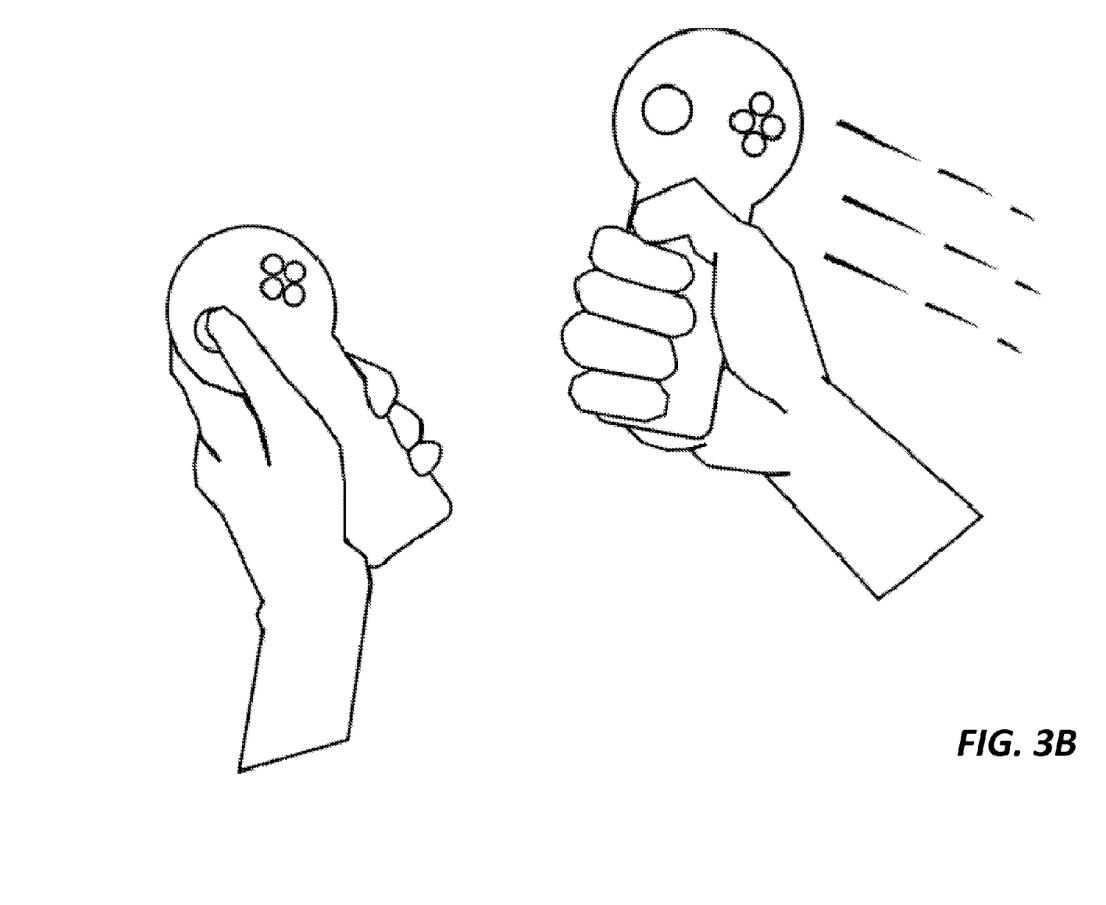
FIG. 3B shows one moment of FIG. 3A in which one controller is being waved to make a movement of a selected object in a virtual environment, and the other controller is being manipulated to cause the object to make an intended action.
Figure 3C:
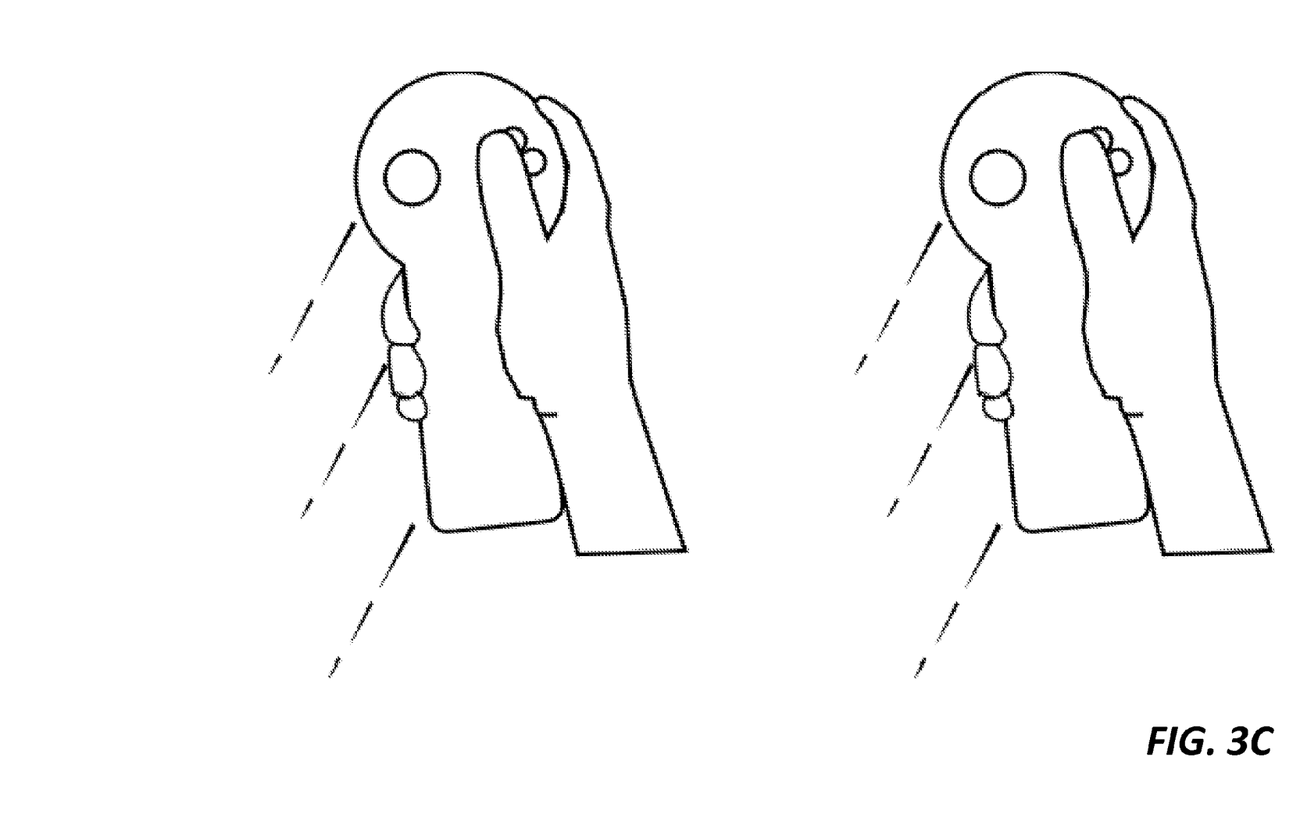
FIG. 3C shows two controllers are respectively being manipulated by two users, each holing one of the controllers, to interact with a virtual environment.

FIGS. 3A, 3B and 3C show three exemplary control paradigms in which the fully functional freeform motion controller can be used to interact with a virtual environment being displayed. FIG. 3A shows two controllers being held in the left and right hands of a user, and being used as a classic controller, i.e., not a motion sensitive controller and so not capable of registering the physical motion of the player. The dashed lines connecting the controllers are shown simply to help visualize how the controllers are comfortable for players to use, and how they support classic controller-controlled games. Basically, if one were to connect the controllers as shown, the form factor is similar to a classic controller, and the sum total of all the control affordances (e.g., analog sticks, buttons, triggers) presents a complete, fully functional set for motion-insensitive gaming.

FIG. 3B shows one moment of FIG. 3A in which the two handed freeform motion control aspect of this solution is being used by a single player. Many important features and benefits of a fully functional freeform motion controller may be appreciated, and may be in part described in the form of an example of a First Person Shooter (FPS) control scheme comparison between what is enabled by the controller in this invention and what is typically available in the current state of the art.

In a FPS game, a virtual in-game camera is roughly positioned behind the shoulder of the player or the main protagonist in the game, so the virtual interactive environment is showing virtual hands of an avatar and the view in front of it on the display. For a classic Xbox-like controller, the control paradigm is to map Left-Analog-Stick to movement in the environment, and Right-Analog-Stick to both looking with the head, and to aiming the gun. For PS3 Move- or Wii Remote—like controllers, the control paradigm is to map Left-Analog-Stick to movement in the environment, and to map Right-Pointing to both looking with the head, and to aiming the gun. In both these cases, overloading one control affordance with two major activities (looking, and aiming) causes many difficulties. For example, how can one tell if the player wants to aim at a bad guy on the right side of the screen, or just wants to look there?

With a fully function freeform motion controller, an entirely new control paradigm is possible that is much more natural and does not have the common overloaded control affordance issues. The new mapping is Left-Analog-Stick for movement in the environment, Right-Analog-Stick for looking with the head, and Right-Pointing to aim. The three major functions are disconnected and can be controlled separately. Thus, there are significant benefits and advantages to adding new control paradigms to the video gaming industry. After all, good control mechanisms are central to importance to good games.

FIG. 3C is an exemplary diagram that makes it clear that a third major mode of operation is to support two players with one controller each. This is possible since the controllers are independently operable and fully functional. This mode additionally enables a super-set of the single-handed motion-controlled games that are enabled with current state of the art controllers, since the analog stick creates many possibilities.

Backwards Compatibility

According to one embodiment, a fixed application programming interface (API) (e.g., a standard device-independent motion data API) is provided for applications. The API abstracts away from details of the controllers (e.g., the controllers 182 of FIG. 1D) that are providing the motion signals, and provides a registration interface with which the manufacturer or distributer or user of a new device can inform the system of the sufficient statistics of the device. This is an essential element for application developers—the less device fragmentation there is, the broader the abstract platform for a given motion sensitive application. An end user is exposed only indirectly to the benefits of the API in that they can now use a broader range of input devices when interacting with their motion sensitive applications. Additionally, the same techniques used for device independence can be applied to ensure the backwards compatibility of the controllers in the present invention with most previous motion sensing controllers on the market before it. There are many benefits and advantages in providing personal motion control solutions that will work with applications that were designed originally for other motion control devices.

As known to those skilled in the art, there are many different inertial sensing devices with a wide range of specifications, error characteristics and capabilities. Operating a device with inertial sensors in one location based on the operation (e.g., algorithm, code and settings) for a different device with sensors in a different location can pose serious barriers in many cases.

Figure 4:
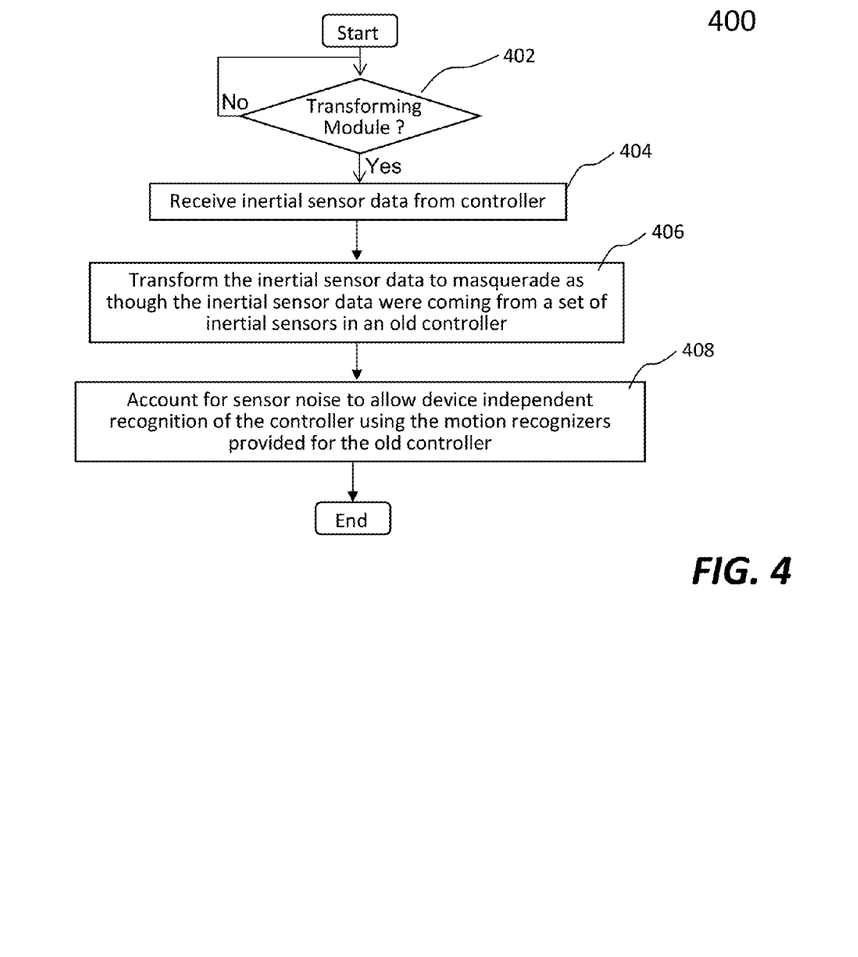
FIG. 4 is a flowchart or process of providing compatibility of a controller per the current invention to a prior-art controller.

FIG. 4 is a flowchart or process 400 of providing compatibility of a controller per the current invention to a prior-art controller. The process 400 may be implemented in hardware, software of in combination of both. According to one embodiment, a driver implementing part of the process 400 is executed in the controller. According to another embodiment, a software module is executed in a base unit to accommodate the controller, where the base unit was designed for an old controller. The software module may be installed into the base unit from different means (e.g., the internet or a readable medium). The process 400 proceeds when a transforming module (e.g., the driver or the software module) is available.

In 404, the inertial sensor data coming from a controller is received. In 406, a transformation of the sensor data is carried out to masquerade as though the inertial sensor data were coming from a set of inertial sensors in an old controller. For example, a controller designed per one embodiment of the present invention is being used to replace a prior-art controller. Depending on implementation, the transformation may be carried out either in a driver for the controller or a software module running on a processing unit for the old controller, which helps ensure the backwards compatible nature of the controller.

For example, for a wide range of accelerometers, if the maximum sensitivities and ranges are known, and the respective locations of the sensor within the rigid controller body are known, the output of two different devices can be mapped to each other without enough information loss to affect motion recognition. In one embodiment, if the other device or controller is not equipped with a gyroscope or other means of providing angular velocity, the gyroscope output data for the controllers in the present invention can simply be ignored.

In another embodiment, the controllers have a SD-card-like interface (e.g., disposed underneath the battery cover) that allows an end user to swap out an older generation of inertial sensors placed on a chip that fits into that interface, with a newer generation of inertial sensors. In this embodiment, the associated driver for the updated controllers is provided and allows the newer sensors to be backwards compatible with the older sensors, by masquerading as the older sensors for applications that require it. In some cases this means artificially cutting off the sensitivity ranges of the new sensors to match the older ones.

Device independence and backwards compatibility must also apply to tracking in a general motion control environment. One exemplary task is to track the positions and orientations of some visible part of the device, in part so that the tracking results can be used as an input to recognition. When tracking a known position on a known device with known sensor locations, a standard approach is to track the location of the sensors over time, then at the end when reporting the results to the user, report the known visible point on the rigid body of the controller instead of reporting the actual sensor position. For example, if the sensors are in the center of mass of the controller, the position and orientation of the center of mass may be first tracked, then the location of the visible point is computed as: Pos—orientation*vecAcc, where Pos is the tracked location of the inertial sensors in world frame, orientation is the orientation of the controller, and vecAcc is the location of the inertial sensors relative to the visible point that are being located.

A more beneficial but challenging problem is to continue using a set of motion recognizers of the old controllers when the device characteristics of the old controllers differ from a new device being recognized. In other words, data from inertial sensors in a new controller and located in a specific position is transformed to act as though the data is being generated from the old sensors residing in a different location in the old controller. The naive approach to transforming the data fails in practice because inertial sensor noise is too strong.

According to one embodiment, in 408, the sensor noise is accounted for to allow device independent recognition of the controller using the motion recognizers provided for the old controller. The following methods of accounting for sensor noise allow device independent recognition through a standard motion data API. To facilitate the understanding of the approach, the following pseudo-code cutout shows the steps involved in correcting inertial readings from a sensor not located at the center of mass, for which no corrections are needed for angular velocity data if the object is a rigid body, and angular velocity data is used to estimate the readings that would have been measured at the center of mass as follows.

LX=accX;
LY=accY;
LZ=accZ;
// Subtract out tangential effects of rotation of accelerometers around center of mass
LZ-=aaX*yOffset;
LY+=aaX*zOffset;
LX-=aaY*zOffset;
LZ+=aaY*xOffset;
LY-=aaZ*xOffset;
LX+=aaZ*yOffset;

```
// Centripetal acceleration, move back to acceleration at
center of mass
    LX+=xOffset*(avY*avY+avZ*avZ);
    LY+=yOffset*(avX*avX+avZ*avZ);
    LZ+=zOffset*(avX*avX+avY*avY);
    // Compensate for gyroscopic effects
    LX-=avX*(avY*yOffset+avZ*zOffset);
    LY-=avY*(avX*xOffset+avZ*zOffset);
    LZ-=avZ*(avX*xOffset+avY*yOffset);
```
Keys: accX, accY, accZ—linear accelerations measured along each axis at sensor position avX, avY, avZ—angular velocities measured around each axis aaX, aaY, aaZ—angular accelerations calculated around each axis xOffset, yOffset, zOffset—physical separation between accelerometers and center of mass LX, LY, LZ—calculated linear accelerations for center of mass Improvements to account for sensor noise:

1) In practice, it is noted that measuring angular acceleration over multiple periods of sensor data gave smoothed estimates that helped reduce the effect of noise on the calculated linear accelerations. The number of readings used varied according to the sampling rate and noise characteristics of the particular gyroscopes.

```
    dt=history[endIndex].time-history[startIndex].time;
    aaX=(history[endIndex].avX-history[startIndex].avX)/
dt;
    aaY=(history[endIndex].avY-history[startIndex].avY)/
dt;
    aaZ=(history[endIndex].avZ-history[startIndex].avZ)/dt;
```

2) Angular acceleration was reduced when the corresponding angular velocity was small. (Most acceleration was found to be a result of noise in this case)

```
    // If angular velocity is small, angular accelerations may be
due primarily to the
    // gyro readings jumping between values, yielding jumps of
up to about 5 rad/sec^2
    if (reduceAA)
    {
    real const aaReduction=5.0f; // Reduce aa this much at zero
        angular velocity (rad/sec/sec)
    real const smallAngularVelocity=0.5f; // Don't adjust
        accelerations if angular velocity above this value (rad/
        sec)
    moveTowardsZero(aaX, asReduction*(smallAngularVel-
        ocity-fabsf(avX))/smallAngularVelocity);
    moveTowardsZero(aaY, aaReduction*(smallAngularVel-
        ocity-fabsf(avY))/smallAngularVelocity);
    moveTowardsZero(aaZ, aaReduction*(smallAngularVel-
        ocity-fabsf(avZ))/smallAngularVelocity);
    }
```

Different embodiments of the present inventions have been described above. One skilled in the art will recognize that elements of the present invention may be implemented in software, but can be implemented in hardware or a combination of hardware and software. The invention can also be embodied as computer-readable code on a computer-readable medium. The computer-readable medium can be any data-storage device that can store data which can be thereafter be read by a computer system. Examples of the computer-readable medium may include, but not be limited to, read-only memory, random-access memory, CD-ROMs, DVDs, magnetic tape, hard disks, optical data-storage devices, or carrier waves. The computer-readable media can also be distributed over network-coupled computer systems so that the computer-readable code is stored and executed in a distributed fashion.

The present invention has been described in sufficient detail with a certain degree of particularity. It is understood to those skilled in the art that the present disclosure of embodiments has been made by way of examples only and that numerous changes in the arrangement and combination of parts may be resorted without departing from the spirit and scope of the invention as claimed. While the embodiments discussed herein may appear to include some limitations as to the presentation of the information units, in terms of the format and arrangement, the invention has applicability well beyond such embodiment, which can be appreciated by those skilled in the art. Accordingly, the scope of the present invention is defined by the appended claims rather than the forgoing description of embodiments.

We claim:

1. A method for providing compatibility of a first controller to a computing device already configured for a second controller, the method comprising:

receiving in the computing device a first set of inertial sensor data from the first controller; and transforming the first set of inertial sensor data in the computing device to masquerade as though the first set of inertial sensor data were coming from a second set of inertial sensors in the second controller, wherein said transforming the first set of inertial sensor data comprises:

replicating operational characteristics of a second set of inertial sensor data of the second controller, and relocating virtually the first set of inertial sensor data from a set of inertial sensors at physical locations in the first controller to appear as though the first set of inertial sensor data were generated from a set of inertial sensors at virtual locations in the first controller in reference to certain physical locations of the set of inertial sensors in the second controller, wherein the physical locations are different from the certain physical locations, and wherein said transforming is executed in a driver for the first controller or a software module running on a processing unit configured to work with the second controller, and the transformed first set of inertial sensor data works with motion recognizers and motion trackers built for the second controller.

2. The method as recited in claim 1, wherein said transforming succeeds when maximum sensitivities and a range of the second controller are known, and respective locations of the second set of inertial sensors within the second controller are known.

3. The method as recited in claim 2, wherein the first set of inertial sensor data includes translational sensor data and angular sensor data, and the angular sensor data is ignored when the second controller is not equipped with angular sensors.

4. The method as recited in claim 3, wherein the translational sensor data is from a plurality of accelerometers, and the angular sensor data is from a plurality of gyroscopes in the first controller.

5. The method as recited in claim 3, wherein the first set of inertial sensor data is received in the processing unit that is configured to discard the angular sensor data.

6. The method as recited in claim 1, further comprising:

treating the transformed first set of inertial sensor data to act as though the first set of inertial sensor data is being generated from the second controller; and accounting for sensor noise to allow device independent recognition of the first controller using the motion recognizers provided for the second controller through a standard motion data library.

7. The method as recited in claim 6, wherein the standard motion data library is an application programming interface (API) including subtracting out tangential effects of rotation of accelerometers around center of mass, moving back to acceleration at center of mass, and compensating for gyroscopic effects.

8. The method as recited in claim 1, wherein the first controller includes a housing having at least a top surface and a bottom surface, the top surface including a number of buttons and a joystick operable by a finger of one hand, the bottom surface including a trigger operable by another finger of the hand, the housing sized to fit into a hand and having a holding portion having the buttons and the joystick reachable by the finger when the holding portion is being held in the hand of a user, and wherein the second controller is different from the first controller.

9. An apparatus for providing compatibility of a first controller and the apparatus being already configured for a second controller, the apparatus comprising:
a wireless interface to receive a first set of inertial sensor data from the first controller;
a processor;
a memory space for storing code executed by the processor to perform operations of:
transforming the first set of inertial sensor data to masquerade as though the first set of inertial sensor data were coming from a set of inertial sensors in the second controller, wherein said transforming the first set of inertial sensor data comprises:
replicating operational characteristics of a second set of inertial sensor data of the second controller, and
relocating virtually the first set of inertial sensor data from a set of inertial sensors at physical locations in the first controller to appear as though the first set of inertial sensor data were generated from a set of inertial sensors at virtual locations in the first controller in reference to certain physical locations of the inertial sensors in the second controller, wherein the physical locations are different from the certain physical location, and wherein the transformed first set of inertial sensor data from the first controller works with motion recognizers and motion trackers in the apparatus built for the second controller.

10. The apparatus as recited in claim 9, wherein said transforming succeeds when maximum sensitivities and a range of the second controller are known, and respective locations of the second set of inertial sensors within the second controller are known.

11. The apparatus as recited in claim 10, wherein the inertial sensor data from the first controller includes translational sensor data and angular sensor data, the angular sensor data is ignored when the second controller is not equipped with angular sensors.

12. The apparatus as recited in claim 11, wherein the translational sensor data is from a plurality of accelerometers, and the angular sensor data is from a plurality of gyroscopes in the first controller.

13. The apparatus as recited in claim 9, wherein the processor is configured to perform further operations of:
treating the transformed first set of inertial sensor data to act as though the first set of inertial sensor data is being generated from the second controller; and
accounting for sensor noise to allow device independent recognition of the first controller using the motion recognizers provided for the second controller through a standard motion data library.

14. The apparatus as recited in claim 13, wherein the standard motion data library is an application programming interface (API) including subtracting out tangential effects of rotation of accelerometers around center of mass, moving back to acceleration at center of mass, and compensating for gyroscopic effects.

15. The apparatus as recited in claim 9, wherein the first controller includes a housing having at least a top surface and a bottom surface, the top surface including a number of buttons and a joystick operable by a finger of one hand, the bottom surface including a trigger operable by another finger of the hand, the housing sized to fit into a hand and having a holding portion having the buttons and the joystick reachable by the finger when the holding portion is being held in the hand of a user, and wherein the second controller is different from the first controller.

* * * * *